March 7, 1967 R. L. KENEIPP, JR 3,307,996
METHOD FOR PLACING A PROTECTIVE COATING
ON THE INTERIOR OF A PIPE
Filed March 29, 1963 2 Sheets-Sheet 1

RICHARD L. KENEIPP JR.
INVENTOR.

BY *[signature]*

ATTORNEY.

March 7, 1967 R. L. KENEIPP, JR 3,307,996
METHOD FOR PLACING A PROTECTIVE COATING
ON THE INTERIOR OF A PIPE
Filed March 29, 1963 2 Sheets-Sheet 2

RICHARD L. KENEIPP JR.
INVENTOR.

BY *Arthur McIlroy*

ATTORNEY.

United States Patent Office 3,307,996
Patented Mar. 7, 1967

3,307,996
METHOD FOR PLACING A PROTECTIVE COATING ON THE INTERIOR OF A PIPE
Richard L. Keneipp, Jr., Mount Carmel, Ill., assignor to Pan American Petroleum Corporation, a corporation of Delaware
Filed Mar. 29, 1963, Ser. No. 268,997
10 Claims. (Cl. 156—287)

The present invention relates to a novel method for protecting the interior of pipelines or tubing from corrosion. In addition, it is concerned with a means for reconditioning corroded pipe and placing the interior thereof in a substantially corrosion-proof condition.

It is known, of course, that steel pipe used, for example, in oil pipelines and oil field flow lines is often subject to extensive corrosion by the acid components in crude oil or natural gas. In many cases the corrosion conditions are so severe that the lines, or at least sections thereof, must be replaced in a matter of months, particularly in the case of production tubing and flow lines. Such corrosion generally does not occur uniformly on the interior of the pipe but appears on the surface in the form of depressions or deep pitted areas. As a result, a section of pipe that does not show much weight loss may be on the verge of rupturing under normal operating conditions. Accordingly, pipe in this condition, if its use is to be continued, must be patched or reinforced by the use of a saddle patch or similar devices. While a measure of this sort generally is adequate to handle the immediate difficulty, it gives no assurance that the same problem will not reoccur.

Accordingly, it is an object of my invention to provide a sufficient means for repairing the interior of corroded pipe by forcing a slug of resin through the pipe while the latter is rotated at a relatively low speed, for example at 10 to 50 r.p.m. It is another object of my invention to provide an improved method of placing a thin liner against an adhesive interior of the pipe. Another object of this invention is to provide a means for filling depressions in a section of pipe being repaired so that when a plastic liner is inserted therein, subsequent pressure will not cause said liner to rupture at the location of such depressions.

Figure 1:
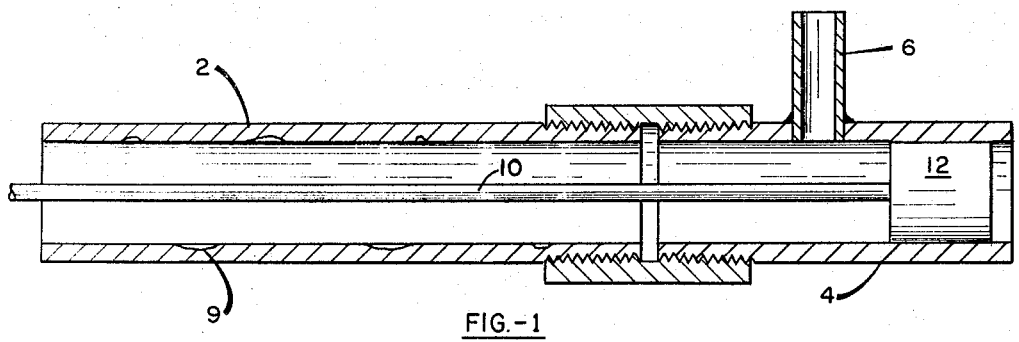
Figure 2:
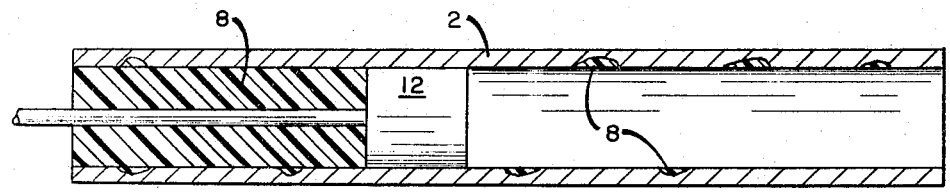
Figure 3:
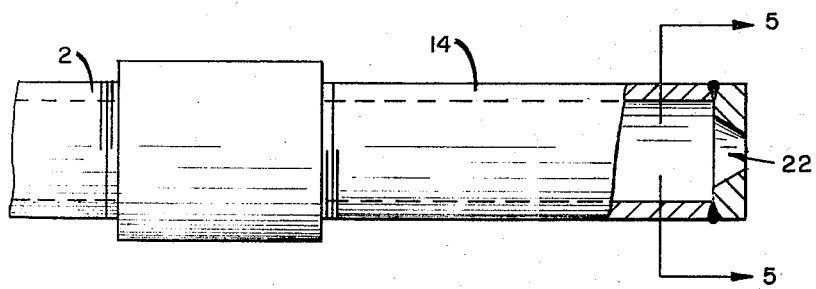
Figure 4:
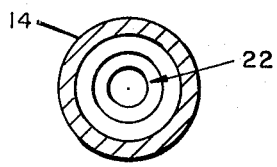
Figure 5:
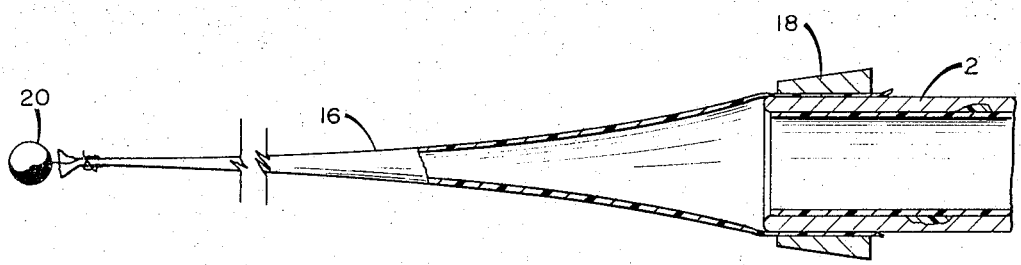
Figure 6:
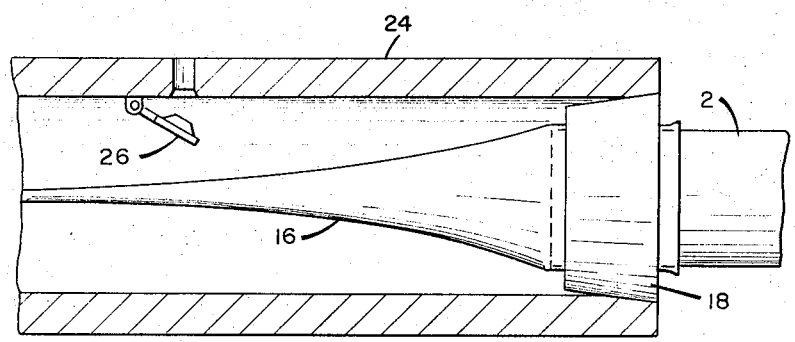
Figure 7:
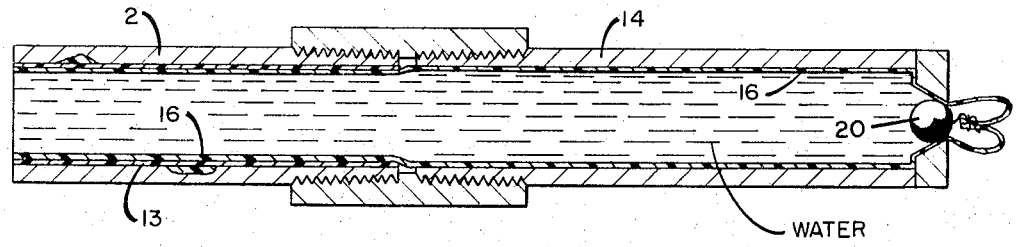

In the accompanying drawings,

FIGURE 1 is a fragmentary view of a section of pipe to be lined,

FIGURE 2 is a sectional view of a corroded pipe illustrating how pits and depressions in the interior thereof are filled by movement of resin therethrough, FIGURE 3 is a view of a collar-pup joint connection to be fitted onto the pipe during the subsequent lining operation, FIGURE 4 is a view of FIGURE 3 taken along line 5—5, showing a ball valve seat which remains open until the final stages of said subsequent lining operation, FIGURE 5 is a view, partly in section, showing how the thin plastic liner is attached to one end of the pipe section being repaired, FIGURE 6 is a sectional view illustrating how said pipe is attached to an interliner machine and the lining placed in position for installation, FIGURE 7 is a sectional view of a pipe filled with water contained in a plastic liner which extends into the collar-pup joint connection shown in FIGURE 3.

This invention, in brief, comprises an improvement in distributing a sealant on the interior surface of a pipe and to a method for placing a thin, flexible liner—for example, 1 to 5 mils in thickness—within a pipe in which such sealant has been applied.

Referring now to FIGURE 1, a section of pipe 2 is first thoroughly cleaned by sandblasting or equivalent means to remove rust or foreign particles from depressions or pits in the interior surface of the pipe. The latter is then fitted (threadedly engaged) to one end of a connection 4 having a top opening 6 into which the resin or sealant material is introduced. This material preferably is an epoxy resin which may or may not have incorporated therein silica flour and/or sand, and chopped fiberglass. The silica flour and/or sand may range in amount from 50 to about 90 percent while the chopped fiberglass content may range from about 3 to about 30 percent. The length of the fiberglass particles may, in general, vary from about $\frac{1}{32}$ to about $\frac{1}{2}$ inch.

In general, I have found that epoxy resins are the most desirable for use in my invention since most other adhesive materials tend to form pin holes or bubbles owing to solvent evaporation and, hence, create centers in which further corrosion can occur. Typically, the resins employed are thermosetting resins, i.e., resins which are capable of undergoing a permanent physical change under the influence of application temperature or an artificially induced higher temperature. Unsaturated polyester resins in addition to the epoxy resins are examples of such materials that may be employed. Epon 828, an epoxy resin manufactured by Shell Chemical Company, is an example of a preferred epoxy resin. As is well known in this art, these resins may be combined and various catalysts or curing agents employed in various concentrations so that the setting or curing time or pot life for various temperatures may be controlled. Versamid resin 140, a polyamide manufactured by General Mills, Inc., is an example of a preferred catalyst which, in the ratio of about 30 parts by volume to 70 parts of the Epon 828 epoxy resin, has a pot life at room temperature of about 3 to 3½ hours.

After a slug of resin 8 has been added via connection 4, lance 10 holding piston or mandrel 12 positioned to the rear of resin slug 8 is drawn through the pipe in the direction shown by the arrow. By this operation the pitted areas 9 in the portion of the pipe interior over which mandrel 12 has passed are filled with resin, as shown in FIGURE 2. The mandrel then wipes excess resin from the interior surface and as said mandrel is withdrawn, such resin is recovered for subsequent use. The material out of which mandrel 12 is constructed may be any of a number of substances. However, I have found that mandrels made of Teflon (a polymer of tetrafluoroethylene), Osage orange wood, chemical-resistant rubber, and nylon are very satisfactory.

In order to insure that the coating of resin has been placed in the pits and/or corroded areas in the interior in uniform fashion, the pipe is preferably spun as the mandrel is withdrawn. After the mandrel is withdrawn, the rotation speed of the pipe is increased to 300 to 1000 r.p.m. and then permitted to rotate freely until it stops. The centrifugal force thus imparted to the resin causes the latter to work to the pipe surface and form a smooth inner resin film on the interior of the pipe. I have found that an epoxy resin surface formed in this manner can be satisfactorily bonded to a Teflon or other plastic liner as will be described in further detail below. The epoxy resin-fiberglass-silica flour lining forms a bond with the interior surface of the pipe that is unaffected by bending or cutting. The liner acts as a compression ring within a tension ring. Deflection of the pipe increases the perimeter of the lining with respect to the pipe wall perimeter and thereby pushes the resulting lining against the wall of the pipe.

Immediately after all pits are filled with the epoxy resin mixture as described above, the interior of the pipe is preferably sprayed with a coat of epoxy resin 13. This coat or film may be of the order of from ½ to about 2 mils in thickness. Thereafter, collar-pup joint connection 14, shown in FIGURE 3, is threadedly engaged to one end of pipe 2 and that end is elevated, preferably on a gradual incline. Next a tubular liner 16 approximately 10 to 12 inches longer than the system into which the liner is inserted is placed over the mouth of the opposite end of said pipe and held in place by means of friction ring 18. To the other end of liner 16 is attached steel ball 20 capable of seating in opening 22 of collar-pup joint connection 14. The free end of liner 16, as well as the larger portion of the length thereof, is then placed in a suitable inter-liner machine such as, for example, one of the type shown in U.S. 2,794,758, and said machine fitted snugly against ring 18. The portion 24 of the inter-liner machine connected to or abutting against ring 18 has a quick opening valve 26 which is set to open so that the air compressed when the liner begins to flow into pipe 2 can pass into the atmosphere through said valve. After all of the air in the interliner system has escaped in this manner, valve 26 is closed when water or other suitable liquid is forced into the system causing liner 16 to turn inside out and progress in the inclined path toward connection 14. Air ahead of the liner is forced out of the opposite end of pipe 2 via opening 22. When the entire section of pipe has thus been lined, excess liner extends into connection 14 where the pressure in the system causes ball 20 to seat in opening 22. After the ball has seated, pressure is built up in the pipe, thereby uniformly forcing the liner against the epoxy adhesive and in this way improving the bond between the liner and adhesive. At the same time, this procedure hydrostatically tests the liner. Thereafter, the pressure is released, water is allowed to flow out of pipe 2 and connection 14 is unscrewed. Excess liner extending beyond the end of pipe 2 is then trimmed flush with the pipe after which the latter is ready for use.

It should be pointed out that where the pipe being repaired is intended to come in contact with substantially anhydrous materials, the liner need not be employed. However, if the bulk of the fluids with which it is to come in contact contains water as a major constituent, then a suitable liner made of polyethylene, polypropylene, unsaturated polyester, Teflon, Saran (a copolymer of vinyl chloride and vinylidene chloride), and the like, should be used. This is because the typical amine cured epoxy resins are not very stable on prolonged contact with water or aqueous fluids.

I claim:
1. In a method for rendering resistant to corrosion the interior surface of a metal conduit having corroded areas on said surface the improvement which comprises:
   injecting into one end of said conduit an amount of a thermosetting resin in excess of that required to fill said areas with said resin,
   forcing the latter through the length of said conduit by means of a mandrel of substantially the same diameter as the internal diameter of said conduit,
   coating the interior of said conduit with a film of said resin,
   affixing to one end of said conduit a section of a second conduit having an opening in the free end thereof which is smaller in diameter than the internal diameter of the first-mentioned conduit,
   peripherally connecting a collapsible tubular plastic liner to the opposite end of said first-mentioned conduit, said liner being longer than the overall length of both conduits and having tied to the free end an element capable of seating in said opening,
   forcing said liner into said first-mentioned conduit via said opposite end by means of a pressurized fluid whereby said liner is placed inside said first-mentioned conduit by turning inside out,
   continuing this lining step until said element seats in said opening,
   applying hydrostatic pressure to the liner adhering to the walls of said first-mentioned conduit,
   releasing said pressure,
   disconnecting said conduits from one another, and
   removing excess liner from said first-mentioned conduit.
2. In a method for rendering the interior surface of a metal conduit having corroded areas on said surface the improvement which comprises:
   injecting into one end of said conduit an amount of a thermosetting resin in excess of that required to fill said areas with said resin,
   forcing the latter through the length of said conduit by means of a piston having substantially the same diameter as the inner diameter of said conduit while spinning the latter,
   affixing to one end of said conduit a section of a second conduit having an opening in the free end thereof which is smaller in diameter than the internal diameter of the first-mentioned conduit,
   peripherally connecting a collapsible tubular plastic liner to the opposite end of said first-mentioned conduit, said liner being longer than the overall length of both conduits and having tied to the free end a ball capable of seating in said opening,
   forcing said liner into said first-mentioned conduit via said opposite end by means of a pressurized liquid whereby said liner is placed inside said first-mentioned conduit by turning inside out,
   continuing this lining step until said ball seats in said opening,
   applying hydrostatic pressure to the liner adhering to the walls of said first-mentioned conduit,
   releasing said pressure,
   disconnecting said conduits from one another, and
   removing excess liner from said first-mentioned conduit.
3. The method of claim 1 in which said thermosetting resin is an epoxy resin.
4. The method of claim 3 in which the epoxy resin film has incorporated therein silica flour and chopped fiberglass.
5. The method of claim 1 in which said liner is made of a polymer of tetrafluoroethylene.
6. The method of claim 3 in which said liner is made of a polymer of tetrafluoroethylene.
7. The method of claim 3 in which said liner is made of an unsaturated polyester.
8. The method of claim 3 in which said liner is made of polyethylene.
9. The method of claim 3 in which said liner is made of a copolymer of vinyl chloride and vinylidine chloride.
10. In a method for rendering resistant to corrosion the interior surface of a metal conduit having corroded areas on said surface the improvement which comprises:
    filling said areas and coating the interior of said conduit with a thermosetting resin,
    affixing to one end of said conduit a section of a second conduit having an opening in the free end thereof which is smaller in diameter than the internal diameter of the first-mentioned conduit,
    peripherally connecting a collapsible tubular plastic liner to the opposite end of said first-mentioned conduit, said liner being longer than the overall length of both conduits and having tied to the free end an element capable of seating in said opening.
    forcing said liner into said first-mentioned conduit via said opposite end whereby said liner is placed inside said first-mentioned conduit by turning inside out,
    continuing this lining step until said element seats in said opening,
    applying a uniform pressure to the liner adhering to the walls of said first-mentioned conduit,
    releasing said pressure,
    disconnecting said conduits from one another, and
    removing excess liner from said first-mentioned conduit.

(References on following page)

References Cited by the Examiner

UNITED STATES PATENTS

| | | | |
|---|---|---|---|
| 1,715,661 | 6/1929 | Kuhlke | 156—294 X |
| 2,440,725 | 5/1948 | Munger | 156—294 X |
| 2,724,672 | 11/1955 | Rubin | 156—294 X |
| 2,794,758 | 6/1957 | Harper et al. | 156—294 X |
| 2,907,103 | 10/1959 | Lewis et al. | 156—294 X |
| 3,080,269 | 3/1963 | Pollock et al. | 156—294 X |
| 3,132,062 | 5/1964 | Lang et al. | 156—294 X |
| 3,202,567 | 8/1965 | Lang et al. | 156—294 |
| 3,230,129 | 1/1966 | Kelly | 156—287 |

EARL M. BERGERT, *Primary Examiner.*

J. J. BURNS, T. R. SAVOIE, *Assistant Examiners.*